Patented Dec. 26, 1939

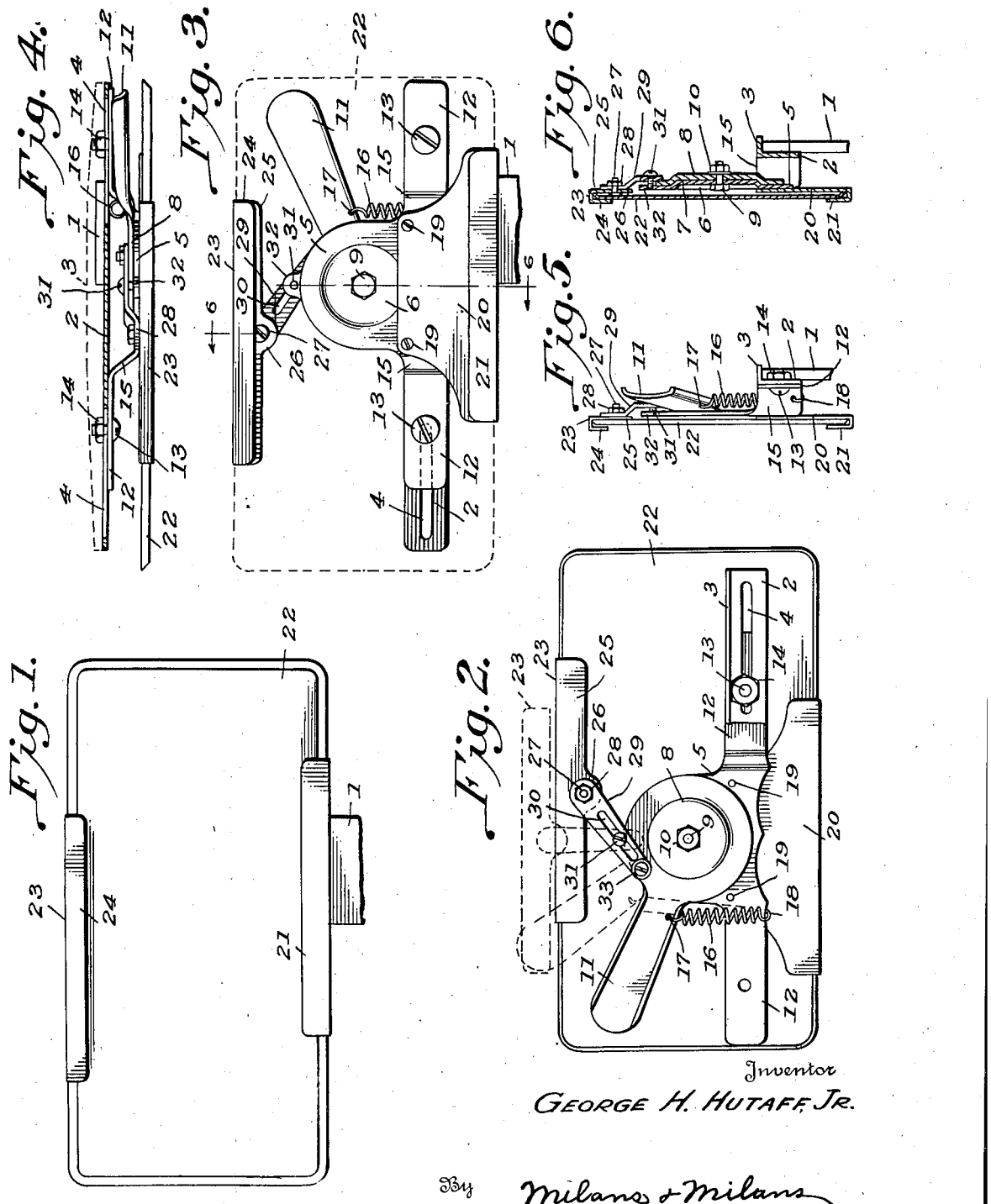

2,185,085

UNITED STATES PATENT OFFICE 2,185,085

LICENSE PLATE HOLDER

George H. Hutaff, Jr., Wilmington, N. C.

Application March 2, 1939, Serial No. 259,477

8 Claims. (Cl. 40—125)

My invention relates to new and useful improvements in a license plate holder and has for its principal object the provision of a device of this character wherein the plate may be positioned in the holder or removed therefrom without the removal of nuts or bolts, channel members being provided to receive the upper and lower edges of the plate and adapted to be operated by means of a lever which when in one position of adjustment will hold the channel members into tight engagement with the edges of the plate and when in another position of adjustment will spread the channel members to permit easy removal of the plate therefrom.

Another object of the invention resides in the provision of a device of the character described which may be readily attached to and is adjustable relative to a bracket secured to the desired position on an automobile or other vehicle, the holder, as previously stated, including a pair of channel members adapted to receive and engage the upper and lower edges of the license plate, said channel members, when spread apart, adapting the license plate to be readily removed or adjusted longitudinally to various positions found desirable.

With the above and other objects in view, which will appear as the description proceeds, my invention consists in the novel details of construction, and arrangement of parts, described in the following specification and illustrated in the accompanying drawing, and while I have illustrated and described the preferred embodiments of the invention, as they now appear to me, it will be understood that such changes may be made as will fall within the scope of the appended claims.

In the drawing:

Fig. 1 is a front elevation showing a license plate supported by the holder.

Fig. 2 is a rear elevation showing the license plate supported by the holder.

Fig. 3 is a front elevation of the holder with the plate shown in outline by dotted lines.

Fig. 4 is a top plan with parts broken away.

Fig. 5 is an end elevation; and

Fig. 6 is a vertical section on the line 6—6 of Fig. 3 looking in the direction of the arrows.

In attaching license plates to automobiles or similar vehicles it has been the usual custom to provide a bracket secured to the desired part of the vehicle and the license plate has been secured to the bracket by means of bolts and nuts, the bolts passing through openings in the license plate provided for this purpose. After a license plate has been in position for some time, usually for a year, the period for which the plates are issued, the nuts will tighten on the bolts due to rust or other reasons and this makes it somewhat difficult to remove the license plate and to attach another one in position. In carrying out my present invention, while of course, a bracket is secured to the vehicle and supports my improved form of holder, the holder is formed and adapted to receive the license plate and hold the same securely in position without passing any bolts or other members through the license plate, the edges of the plate being received in channel members which may be spread apart to easily receive the plate therebetween or for removal purposes.

In the drawing the bracket which is secured to the automobile or other vehicle is shown as including a plate 1 or other supporting arm and the horizontal bar 2 secured to the upper end of the plate or support 1 in any desired manner. The plate or support 1 will be secured to the vehicle in any desired manner and the bar 2 is formed along its upper edge with the outwardly directed flange 3 and adjacent each end with an elongated opening 4, as shown more particularly in Fig. 4 of the drawing.

My improved form of holder includes a plate 5 having the central depression 6, forming a rearwardly directed circular projection 7, adapted to form a bearing for a rotatable plate 8, formed in its inner or front face with a recess to receive the projection 7 of the plate 5, as is quite clearly illustrated in Fig. 6 of the drawing. A bolt 9 passes through the projection 7, of the plate 5, and through the plate 8 to form a pivot about which the plate 8 may be rotated, a nut 10 being received on the bolt as shown. The plate 8 is formed with a handle or grip portion 11 by means of which the plate may be rotated in a manner to be later described.

Extending laterally from each side of the plate 5 is an arm 12, these arms each being provided with an opening to receive a bolt or screw 13, these bolts or screws, when the holder is positioned relative to the bracket extending through the elongated openings 4 of the bar 2 and receiving the nuts 14. It will be noted that when the plate holder is positioned relative to the bracket that the arms 12 extend parallel with the bar 2, the arms being bent from the plane of the plate 5 by the offsets 15, shown more particularly in Fig. 4 of the drawing. This offset of the arms will provide a space between the bracket and the license plate for operating parts in a manner to be later described. A coiled spring 16 is connected to the handle or grip portion 11 at 17 and to one of the offset portions 15 at 18. This coiled spring normally holds the handle or grip portion 11 in what might be termed its lowered position.

Secured to the plate 5, by means of the screws 19 or other suitable fastenings, is what might be termed the lower channel member which includes the vertically extending plate 20 having its lower edge turned upwardly, as shown at 21, to extend parallel with the face of the plate but spaced therefrom to provide a channel for the bottom edge of the license plate which is shown at 22. The upper channel member is shown at 23 and includes the spaced parallel plates 24 and 25 between which is received the upper edge of the license plate. The plate 25 is formed with the ear or lug 26 to which is pivotally connected by means of a bolt or screw 27 and nut 28, one end of an arm 29 having an elongated opening 30 in which operates a screw or pin 31 carried by a lug or projection 32 on the plate 5, as shown more clearly in Figs. 2, 3 and 6 of the drawing. The end of the arm 29, opposite to that connected to the channel member 23, is pivotally connected to the rotatable plate by a screw or pin 33, shown more clearly in Fig. 2 of the drawing.

With the parts positioned, as shown in the drawing, the license plate 22 is held in position for use, it being noted that the upper and lower edges of the plate are received in the channel members and that the coiled spring 16 is pulling downwardly on the lever or grip 11 to in turn pull downwardly on the link 29 which in turn draws the upper channel member 23 into tight engagement with the upper edge of the plate and force the same into tight engagement in the lower channel member. When it is desired to remove or adjust the plate 22 the handle or grip 11 is swung into the dotted line position shown in Fig. 2 of the drawing and this rotates the plate 8 to which one end of the link 29 is secured by the screw 33. The rotation of the plate 8 forces the link 29 upwardly into the dotted line position shown in Fig. 2, it being understood that the link 29 is swung into the vertical position shown by dotted lines due to the pin or screw 31 engaging in the elongated opening 30 and acting as a pivot for the link. With the link thus swung into the vertical position it raises the upper channel member 23 into the position shown by dotted lines in Fig. 2 thereby releasing the upper channel member from the upper edge of the plate so that the plate may be withdrawn from the lower channel member. To position and hold the license plate in the holder the upper channel member 23 will be positioned as shown by dotted lines in Fig. 2 and the lower edge of the plate will be slid into the lower channel member. Then the handle or grip 11 will be released so that it will be drawn downwardly to its normal full line position shown by the coiled spring 16 and in turn draw the upper channel member downwardly into engagement with the upper edge of the plate. It will be seen that I have provided a novel form of license plate holder in which the plate may be adjusted, removed or replaced, without the necessity of loosening or tightening any nuts or bolts as is now commonly the case. At the same time the holder itself may be adjusted on the bar 2 of the supporting bracket by loosening the nuts 14 and sliding the bolts 13 into the desired positions in the elongated openings 4.

Having fully described my invention what I claim as new and desire to secure by Letters Patent is:

1. A license plate holder including a support, a channel member fixed to the support against movement relative thereto and adapted to engage one edge portion of the license plate, a plate carried by and rotatable relative to the support, a second channel member adapted to engage an opposite edge portion of the license plate, means connecting the second-mentioned channel member and rotatable plate, and a member engageable for rotating the plate to move the second-mentioned channel member relative to the first-mentioned channel member and to disengage the second-mentioned channel member from the edge of the license plate.

2. A license plate holder including a support, a channel member secured to the support against movement relative thereto and adapted to engage one edge of the license plate, a second channel member adapted to engage the opposite edge of the license plate, a member rotatably mounted on the support, a link connecting the rotatable member and second-mentioned channel member, and means engageable for operating the rotatable member to move the second-mentioned channel member relative to the first-mentioned channel member to permit adjustment or removal of the license plate.

3. A license plate holder including a support, a channel member secured to the support and adapted to engage one edge of the license plate, a second channel member adapted to engage the opposite edge of the license plate, a member rotatably mounted on the support, a link connecting the rotatable member and second-mentioned channel member, said link having an elongated opening therein, a member carried by the support and engageable in the elongated opening of the link, and a member engageable for operating the rotatable member to slide the link and swing the same on the member engageable in the elongated opening thereof, said movement of the link moving the second-mentioned channel member relative to the first-mentioned channel member to permit adjustment or removal of the license plate.

4. A license plate holder including a support, oppositely disposed channel members adapted to receive and engage edge portions of the plate, rotatable means operable to move one of the channel members relative to the other to permit adjustment or removal of the plate, and means connected to the support and rotatable member for normally holding the rotatable member to in turn hold the channel members in engagement with the edge portions of the plate.

5. A license plate holder including a support, oppositely disposed channel members adapted to receive and engage edge portions of the plate, rotatable means operable to move one of the channel members relative to the other to permit adjustment or removal of the plate, and spring means connected to and interposed between the support and rotatable member for normally holding the rotatable member to in turn hold the channel members in engagement with the edge portions of the plate.

6. A license plate holder including a support, a channel member connected to the support against movement relative thereto and adapted to receive and engage one edge portion of the license plate, a second channel member adapted to receive and engage an opposite edge portion of the license plate, a member rotatably mounted on the support, means connecting the rotatable member and the second-mentioned channel member, and a handle formed integral with the rotatable member and adapted to be engaged for operating the same, said operation of the rotatable member moving the second-mentioned channel member relative to the first-mentioned channel member to permit adjustment or removal of the license plate.

7. A license plate holder including a support having a projection from one face, a channel member secured to the support and adapted to engage one edge portion of the license plate, a plate rotatably mounted on the projection of the support, a second channel member adapted to engage an opposite edge portion of the license plate, means connecting the second-mentioned channel member and rotatable plate, and a member engageable for rotating the plate to disengage the second-mentioned channel member from the edge of the license plate.

8. A license plate holder including a support having a projection from one face, a channel member secured to the support and adapted to engage one edge portion of the license plate, a plate rotatably mounted on the projection of the support, said plate having a recess to receive the projection of the support, a second channel member adapted to engage an opposite edge portion of the license plate, means connecting the second-mentioned channel member and rotatable plate, and a member engageable for rotating the plate to disengage the second-mentioned channel member from the edge of the license plate.

GEORGE H. HUTAFF, Jr.